United States Patent [19]

Wester et al.

[11] 4,147,061
[45] Apr. 3, 1979

[54] THERMOCOUPLE REFERENCE JUNCTION CALIBRATOR

[75] Inventors: Douglas J. Wester; Robert D. Martin, both of Huntsville, Ala.

[73] Assignee: Avco Corporation, Huntsville, Ala.

[21] Appl. No.: 922,531

[22] Filed: Jul. 7, 1978

[51] Int. Cl.² .............................................. G01K 7/12
[52] U.S. Cl. ........................................ 73/341; 73/361
[58] Field of Search ................... 73/341, 361; 136/222

[56] References Cited
U.S. PATENT DOCUMENTS

| 3,069,909 | 12/1962 | Hines | 73/361 |
| 3,192,770 | 7/1965 | Bash | 73/361 |
| 3,648,523 | 3/1972 | Kemper | 73/341 |

Primary Examiner—S. Clement Swisher
Attorney, Agent, or Firm—Robert J. McNair, Jr.; Irwin P. Garfinkle

[57] ABSTRACT

Apparatus is disclosed which provides an improved means of measuring the operating characteristics of a multiplicity of thermocouple reference junctions. The apparatus allows accurate sensing of temperature through use of both a measurement and reference junction thermocouple arrangement. The reference junction thermocouples are collectively encased and surrounded by an insulating medium which on one side abuts a metal plate serving as a heat sink of appreciable mass. The operating temperature of the heat sink is then monitored by a temperature sensitive resistor. Voltage drop across the resistor is convertible into a measure of system calibration.

6 Claims, 2 Drawing Figures

THERMOCOUPLE REFERENCE JUNCTION CALIBRATOR

BACKGROUND AND SUMMARY OF THE INVENTION

Accurate temperature determination by thermocouple requires that the measurement junction be placed in series with a reference junction. The accuracy of the resulting temperature reading derived from the thermal EMF across the measurement junction requires knowledge of the temperature at the location of the reference junction. Prior art systems have utilized such things as ice baths or ovens to establish a stable, known environment for the reference thermocouple junction.

More recently, a temperature conditioning approach has been generated (See Hy-Cal Engineering, REF-BLOC 405 System). The reference block approach provides isothermal conditioning of the thermocouple reference junctions and a quantifiable amount of the leadwires adjacent the junction. This pre-conditions the leadwires to the same temperature as the block and prevents the leadwires from absorbing heat from the reference junctions, thereby avoiding errors. All input leads are connected via large head electrical screws to terminals on one side of the reference block and the output leads are attached to terminals on the opposite side of the block. A calibrated temperature monitoring device is attached to the reference block, resilient insulation is attached, and the entire reference block is enclosed in a weather-proof case.

With such a prior art system, the measurement thermocouple leadwires, one of which might be copper, the other constantan, would be connected to the input screws of the reference block. If both input screws are of copper, there is a reference junction formed between the copper screw head and the constantan leadwire. There are no thermocouple junctions formed at the other input screws and at the output screws since both wires and screws are copper. A common procedure is then to connect the output wires to a printed circuit edge card connector for multiplexing each channel into a meter or an analog-to-digital converter which provides computer compatible processing data. The isothermal block may or may not include an additional connection for each channel for the purpose of providing a path for an electrostatic shield wire.

Our invention improves on the above prior art system in that need for a separate reference block is eliminated. Direct connection of the incoming measurement thermocouple leads to a multiple terminal edge card connector is permitted. The reference junction is established when the dissimilar metal of the leadwire (for example, constantan) is mated to the terminal on the edge card connector. Each edge card connector accommodates several channels. By arranging several edge connected printed circuit cards in one case, a system with several dozen thermocouples can be configured. The sequencing logic can then be arranged so that temperatures of each thermocouple can be serially sampled.

With our invention the multiplicity of edge card connector terminals are made to abut an aluminum plate which presses against the insulated rear face of each connector. The aluminum plate acts as an isothermal heat sink for all of the connectors. A temperature sensitive resistor immediately adjacent the center of the aluminum plate makes it possible to measure and calibrate the temperature of all of the referenced junctions. As a result, high measurement accuracy is achieved with improved reliability.

IN THE DRAWINGS

The invention is illustrated by way of example in the accompanying drawings, in which.

DESCRIPTION OF THE PREFERRED EMBODIMENT

Figure 1:
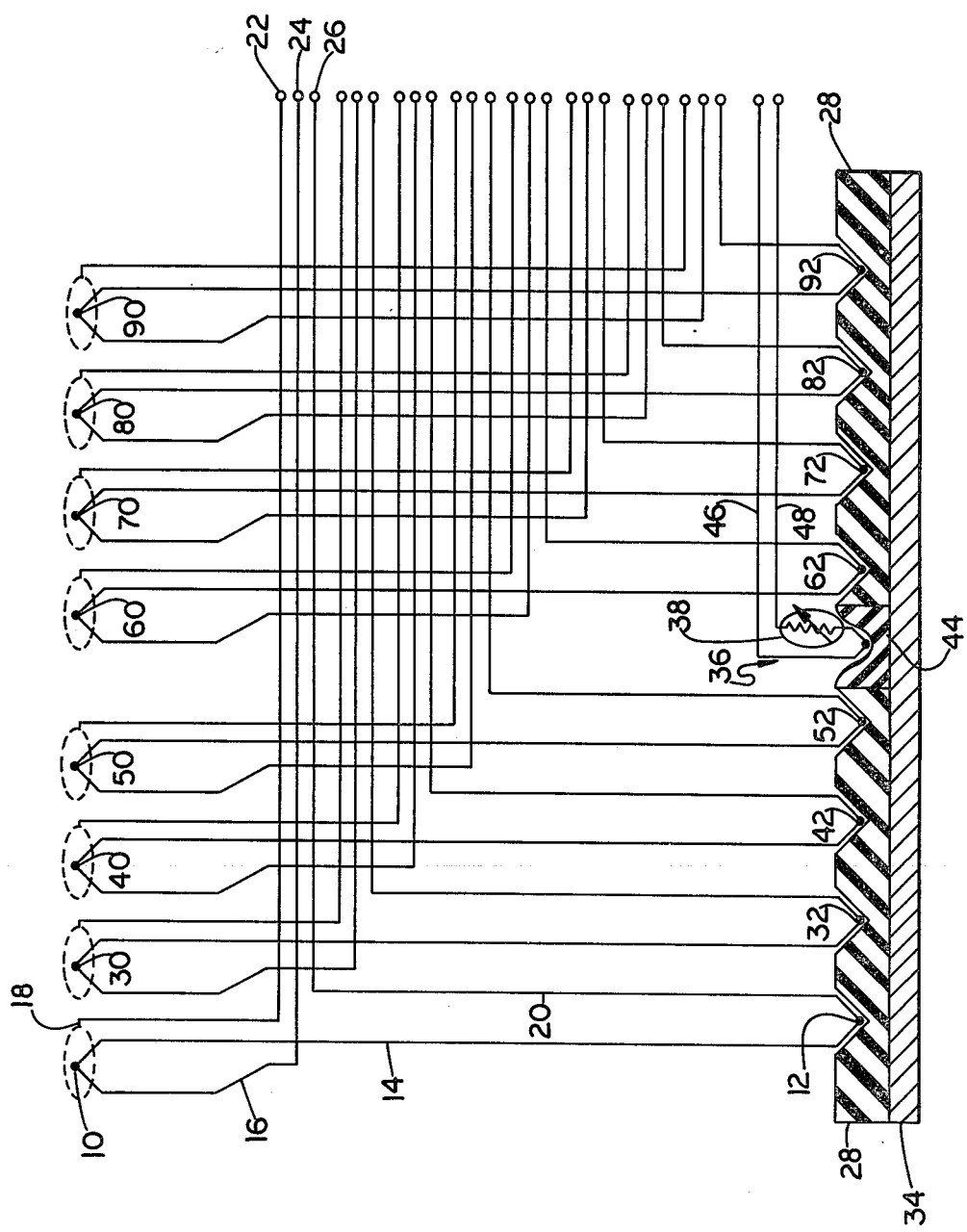
FIG. 1 is a schematic of the isothermal arrangement provided for the reference thermocouple junctions.

Referring to FIG. 1, there is shown a schematic of a multiplicity of thermocouple sensors, each comprising a measurement junction 10 and a reference junction 12. Measurement junction 10, in the system reduced to practice consisted of constantan leadwire 14 joined to a copper leadwire 16, the two leadwires being cabled inside an electrostatic shield 18. Reference junction 12 has constantan leadwire 14 joined to a copper leadwire 20. Output terminals 22, 24 and 26 have respectively, the electrostatic shield and the two thermal EMF signal lines. The voltage across terminals 24 and 26 will amount to approximately 10 millivolts for the case where copper-constantan junctions are used and the temperature difference between the environment surrounding junctions 10 and 12 is on the order of 400° F.

For a discussion of thermoelectric potential and thermocouples see, for example, Mechanical Engineers' Handbook, T. Baumeister, Editor, Sixth Edition, McGraw-Hill Book Co., Inc., pp 16 – 13 to 16 – 15.

In the same way described above, the series combination of a measurement junction and a reference junction comprising junction pairs 30 and 32, 40 and 42, 50 and 52, 60 and 62, 70 and 72, 80 and 82, plus 90 and 92 produce EMF potentials which appear across the row of terminals immediately below terminal 26.

The multiplicity of reference junction terminals 12, 32 et seq are imbedded in an insulating medium 28. In the unit reduced to practice, insulating medium 28 was a continuous strip of thermal setting epoxy. In physical contact with insulating medium 28 and forming a heat sink therefore is a flat metal plate 34.

In approximately the middle of metal plate 34 is a temperature sensitive resistor module 36. Module 36 consists of a temperature sensitive resistor 38 which is imbedded in insulation block 44 and having output leads 46 and 48. Temperature sensitive module 36 is used to monitor the temperature of the entire isothermal reference plane consisting of insulating medium 28 backed up by metal plate 34.

Figure 2:
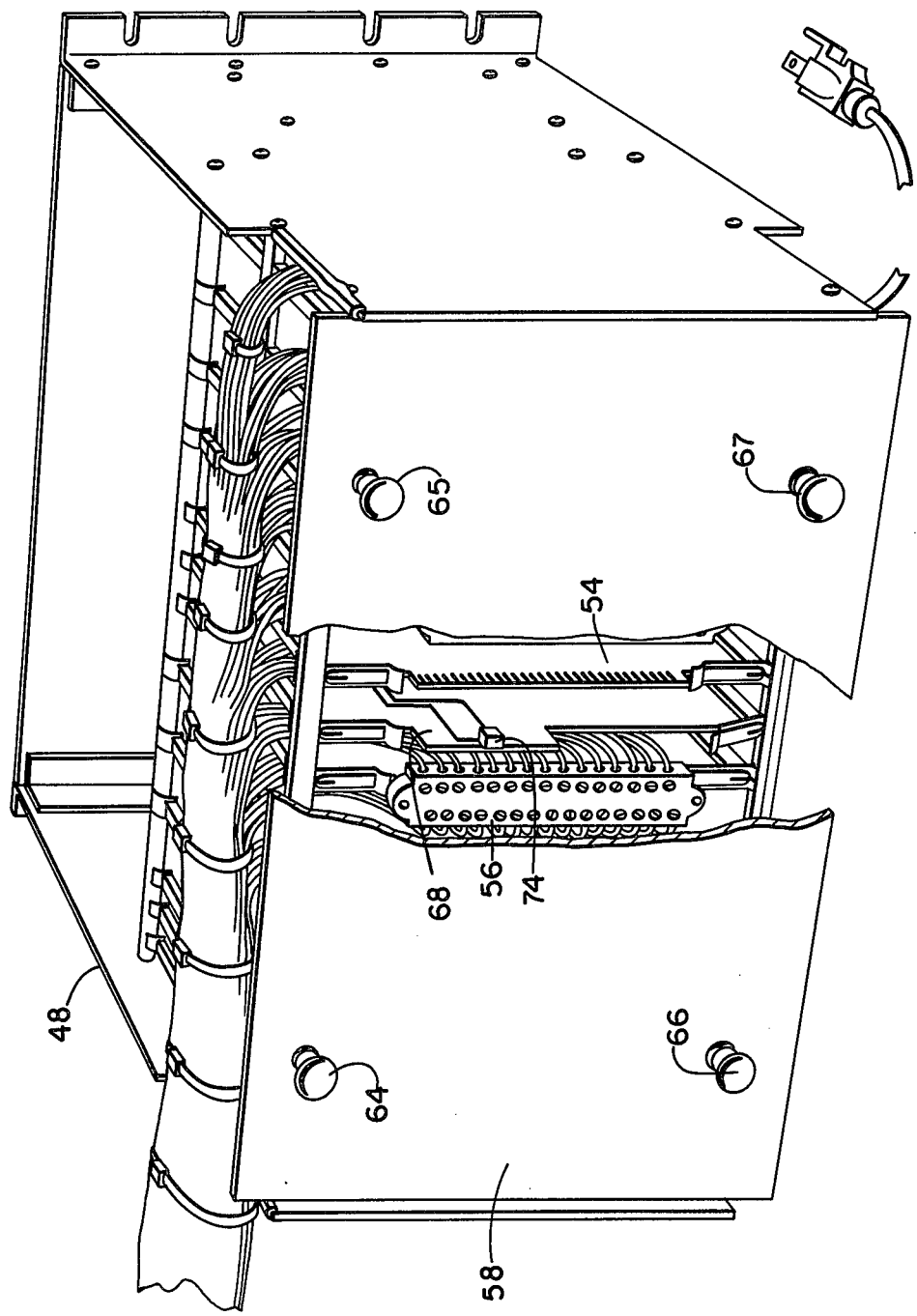
FIG. 2 is an isometric view, partially cutaway, of the rear side of the case containing the reference thermocouple junctions.

Reference to FIG. 2 shows the physical arrangement of our invention. Case 48 contains the electronic assemblies associated with a 100 channel thermocouple temperature measuring system. The system reduced to practice included ten printed circuit boards 54 in a side-by-side vertical orientation. On each printed circuit board where the relays and integrated circuit modules which collectively made up a 100-channel sample data analog to digital conversion system useful in converting the thermocouple sensor signals to computer compatible format.

An edge card connector 56 slips over the end of each printed circuit board (For clarity, FIG. 2 shows printed circuit board 54 with its edge card connector removed). Each edge card connector 56 accommodates 10 thermocouple channels, each comprised of two thermocouple wires and a shield. As may be noted, the edge connector 56 contains thirty screw terminals. Attachment of the two thermocouple wires and associated shield coming from each measurement junction (See reference numerals 14, 16 and 18 in FIG. 1) is accomplished by insertion of the wires under three appropriate hold down screws of edge connector 56.

Tightening of the hold down screws against its respective wire causes the head of the screw to be below the surface of the connector epoxy from which the body of the edge card connector is formed. The epoxy body of edge card connector 56 is equivalent to insulating medium 28 shown in FIG. 1. Attachment of metal back 58 onto case 48 by means of thumb screws 64, 65, 66 and 67 brings the metal backing into positive contact with the epoxy body of all of the edge card connectors. Metal back 58 thus acts as a heat sink for the multiplicity of edge card connectors 56, functioning in fact as metal plate 34 of FIG. 1.

In the center of the electronic assembly and between adjacent printed circuit boards 54 is an eleventh card 68 on which is mounted an encapsulated temperature sensitive module 74. Module 74 is equivalent to module 36 shown in FIG. 1. Encapsulated module 74 contacts metal back 58 when it is attached by thumb screws 64 - 67 to case 48. The temperature sensitive element in the unit reduced to practice was a thermistor having a specified accuracy of 0.1° C. over the temperature range of 0 - 50° C. Accuracy at 25° C. was 0.05° C. The encapsulated thermistor, being in proximity to metal back 58 and surrounded by the multiplicity of cables 76 containing the thermocouple wires which connect to the edge connectors 56, accurately measures the temperature of the entire complement of reference junctions.

The junction between the screw heads contained in edge connector 56 and the constantan leadwires coming from the measurement thermocouple junctions produce reference junctions. In the unit reduced to practice, the screws were cadmium plated steel. These were used to give strength and to prevent corrosion. Further, the contacts of the edge connectors were gold plated to assure good electrical contact. The result is that there is not just one thermocouple EMF but a series. The sum of the series of EMF potentials work out the same as for those reference junctions (12, 32, 42, et seq.) shown in FIG. 1 because electrical continuity into and out of the printed circuit board always contains the same sequence of metals on both leadwires. As a result, the EMF potential across the composite reference junction of FIG. 2 is the same as that across the reference junction of the FIG. 1 showing.

In the FIG. 2, system, the mass of encapsulant placed around the temperature sensitive resistor element was sized such that it closely approximated the thermal lag of reference junctions in response to a change in ambient temperature. Due to the large amount of plastic making up the body of each of the edge connectors and the ability of the back plate to maintain a uniform surface temperature, the thermal gradient across the entire 100 reference junction array was minimized. When installed in the case shown in FIG. 2, the operating system was found to have errors attributable to the connector thermal gradients amount to less than + or − 0.1° C. This is an order of magnitude less than that which may be expected from an uncalibrated thermocouple arrangement.

It is to be understood that while copper-constantan thermocouples have been used in the description, this invention is by no means restricted to this type of thermocouple but will work equally well with other thermocouple types such as iron-constantan, chromel-alumel, platinum/platinum rhodium, etc. Further, different types of thermocouple junctions can be utilized in a given system through adjustment of the compensating electronic circuitry used with the reference junctions.

We claim:

1. In combination with a temperature measuring system of the type having a multiplicity of thermocouple sensors, each comprising a measurement junction and a reference junction, the output of the multiplicity of thermocouple sensors being connected via leadwires to printed circuit boards for multiplexing each channel into a meter or analog-to-digital converter which provides computer compatible processing data, the improvement which comprises:

a multiplicity of edge card connectors, one slipped over the end of each printed circuit board, said edge card connectors serving to encircuit said printed boards with said thermocouple sensors, each of said edge card connectors having a body formed of an insulating medium which contains the electrical circuit completing elements imbedded therein;

means for forming said reference junctions in said edge card connectors, said means comprising use of hold down screws as terminations for said leadwires from the thermocouple measurement junctions, said hold down screws being formed of a material which generates a temperature varying electromotive force when brought in contact with at least one of the leadwires from said measurement junction;

a heat conductive plate physically contacting the back side of all of said multiplicity of edge card connectors, said plate being of sufficient mass to form a heat sink for said edge card connectors; and an encapsulated temperature sensitive module in proximity to a mid-area point on said heat conductive back plate for measuring the temperature of the entire complement of said edge card connectors, reference junctions and adjacent heat conductive plate.

2. The invention according to claim 1 wherein the hold down screws are formed of cadmium plated steel.

3. The invention according to claim 1 wherein the terminations for attaching the thermocouple leadwires to said edge card connectors include means for electrostatic shield grounding.

4. The invention according to claim 1 wherein the encapsulated temperature sensitive element contains a thermistor having a specified accuracy of 0.1° C. over the temperature range of 0° C. to 50° C.

5. The invention according to claim 1 wherein the thermocouple measurement junctions are formed of copper/constantan.

6. The invention according to claim 1 wherein the temperature measuring system includes provision for as many as 100 thermocouple sensors, each of said edge card connectors accommodating up to 10 thermocouple sensors.

* * * * *